(12) United States Patent
Thanabalan

(10) Patent No.: US 10,459,833 B2
(45) Date of Patent: Oct. 29, 2019

(54) SOFTWARE INTEGRATION TESTING WITH UNSTRUCTURED DATABASE

(71) Applicant: ACCENTURE GLOBAL SOLUTIONS LIMITED, Dublin (IE)

(72) Inventor: Sakthivel Thanabalan, Charlotte, NC (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 27 days.

(21) Appl. No.: 15/131,797

(22) Filed: Apr. 18, 2016

(65) Prior Publication Data

US 2017/0300404 A1    Oct. 19, 2017

(51) Int. Cl.
| | | |
|---|---|---|
| G06F 9/44 | (2018.01) | |
| G06F 11/36 | (2006.01) | |
| G06F 16/33 | (2019.01) | |
| G06F 16/25 | (2019.01) | |

(52) U.S. Cl.
CPC .......... G06F 11/3688 (2013.01); G06F 11/36 (2013.01); G06F 11/3692 (2013.01); G06F 16/252 (2019.01); G06F 16/334 (2019.01)

(58) Field of Classification Search
CPC ............................................ G06F 11/36–3696
USPC .................................... 714/38; 717/124–135
See application file for complete search history.

(56) References Cited

U.S. PATENT DOCUMENTS

| | | | | |
|---|---|---|---|---|
| 6,138,112 A * | 10/2000 | Slutz | ................... | G06F 11/3672 707/748 |
| 6,345,266 B1 * | 2/2002 | Ganguly | ........... | G06F 17/30091 707/999.001 |
| 6,408,298 B1 * | 6/2002 | Van | ................... | G06F 17/30067 707/999.01 |
| 7,010,546 B1 * | 3/2006 | Kolawa | ............... | G06F 11/3688 707/694 |
| 7,552,358 B1 * | 6/2009 | Asgar-Deen | ........ | G06F 11/1435 714/15 |
| 7,873,619 B1 * | 1/2011 | Faibish | ............. | G06F 17/30091 707/705 |
| 9,760,571 B1 * | 9/2017 | Ben-Natan | ........ | G06F 17/30011 |
| 2005/0066155 A1 * | 3/2005 | Dutt | .................. | G06F 17/30094 713/1 |
| 2007/0185938 A1 * | 8/2007 | Prahlad | ............. | G06F 17/30212 707/999.204 |

(Continued)

*Primary Examiner* — Jue Louie
(74) *Attorney, Agent, or Firm* — Mannava & Kang, P.C.

(57) ABSTRACT

According to examples, software integration testing with an unstructured database may include retrieving a configuration file stored in memory, and parsing the configuration file to identify configuration details of an unstructured database. A connection may be established between an integration testing tool and the unstructured database based on the configuration details. Software integration testing with an unstructured database may further include identifying a transaction file specifying a database operation to be performed by the unstructured database to retrieve data stored in the unstructured database responsive to the application performing a function. A query may be generated based on the database operation. The query may be sent, via an interface, to the unstructured database for execution. Results of the query may be received via the interface. The query results may be compared to validation data to determine whether the function operates in a determined manner.

17 Claims, 5 Drawing Sheets

(56) References Cited

U.S. PATENT DOCUMENTS

| | | |
|---|---|---|
| 2011/0010685 A1 | 1/2011 | Sureka et al. |
| 2011/0040808 A1 | 2/2011 | Joy et al. |
| 2012/0042210 A1* | 2/2012 | Glaser ................. G06F 11/3684 714/38.1 |
| 2014/0025704 A1* | 1/2014 | Jin .................... G06F 17/30477 707/770 |
| 2014/0115438 A1 | 4/2014 | Bhatt et al. |
| 2014/0258987 A1 | 9/2014 | Zhou et al. |
| 2015/0212920 A1* | 7/2015 | Kraus ................. G06F 11/3466 717/127 |

* cited by examiner

Transaction
File
118

300 — `<Transaction>`
302 — `<Transaction-ID> 121 </Transaction-ID>`
304 — `<Type> Read </Type> [Read/Insert/Update/Delete]`
306 — `<Query> Select a, b, c from MyTable where x=? And y =? </Query>`
`<Transaction-ID> 122 </Transaction-ID>`
..
..

`</Transaction>`

FIG. 3

SOFTWARE INTEGRATION TESTING WITH UNSTRUCTURED DATABASE

BACKGROUND INFORMATION

Integration testing may be performed to ensure that a software application operates correctly. Difficulties may arise when performing integration testing because of incompatibilities between an integration tester that is used to test an application and a component, such as a database, that is used by the integration tester to test the application. For example, the integration tester may be incompatible with the database, and cannot execute queries on the database to retrieve data needed to test the application. As a result, uncertainty may exist as to whether an application will operate correctly when deployed in a production setting.

BRIEF DESCRIPTION OF DRAWINGS

Features of the present disclosure are illustrated by way of examples shown in the following figures. In the following figures, like numerals indicate like elements, in which:

FIG. 3 illustrates a transaction file for the integration testing adapter of FIG. 1, according to an example of the present disclosure;

DETAILED DESCRIPTION

Figure 1:
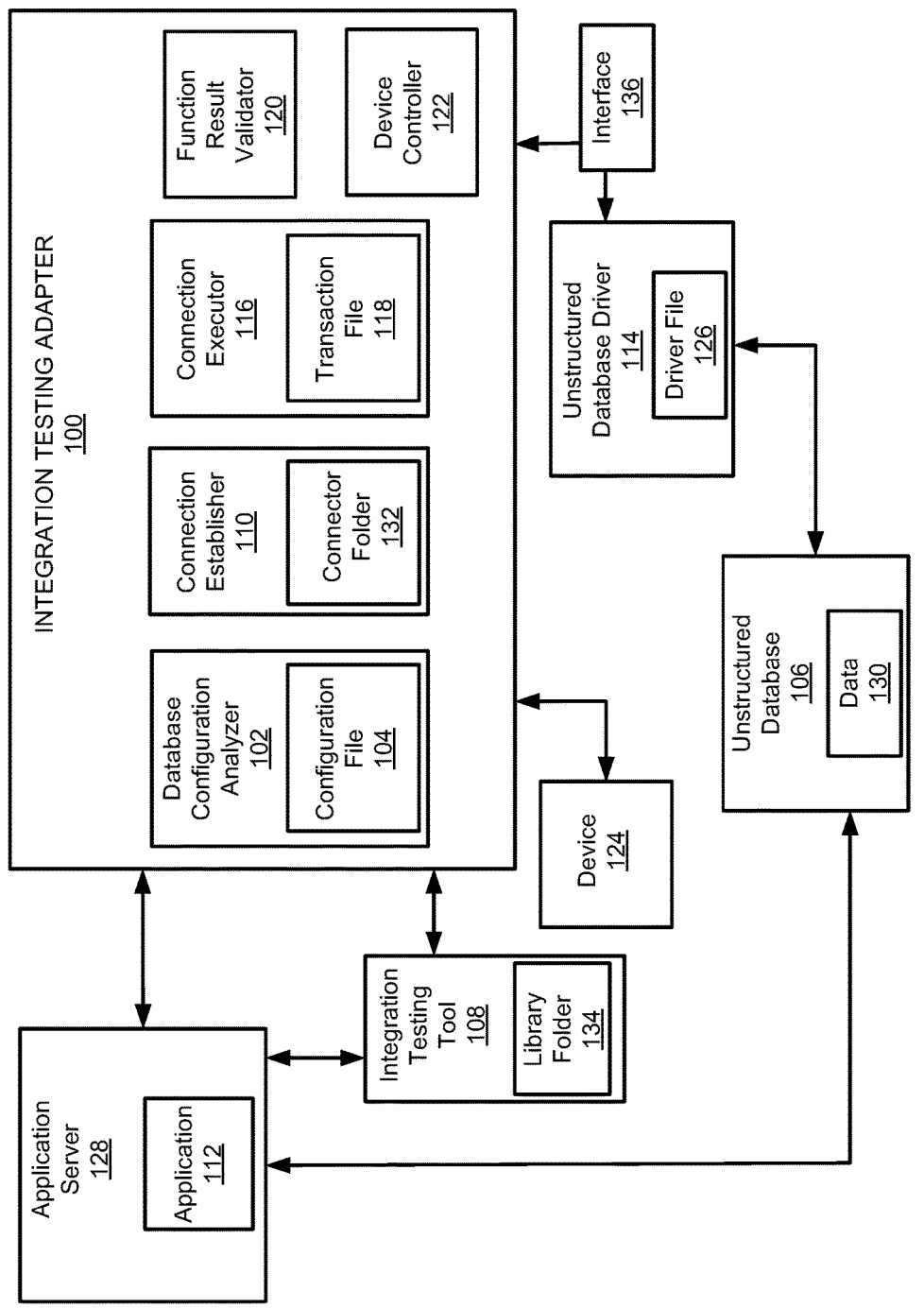
FIG. 1 illustrates an architecture of an integration testing adapter, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

There is an ever increasing need to test applications that interact with unstructured databases. Existing integration testing tools are designed to test applications that utilize structured databases. As a result, it is difficult to know if applications work correctly with unstructured databases. According to examples of the present disclosure, an integration testing adapter (ITA) solves the problem by making it possible for an integration testing tool to test applications that interact with unstructured databases. The ITA establishes a connection between the integration testing tool and the unstructured database to facilitate the testing of the application, and thus minimizes incompatibilities that may otherwise occur between the integration testing tool and the unstructured database to perform the testing.

An unstructured database, for example, includes data that is not stored according to a predefined data model or schema. In contrast, a structured database requires prior knowledge of an information schema to maintain a structure within the database. For example, in a structured database, data is commonly stored in rows and columns according to a schema that specifies the data to be included in each field. An unstructured database may store data that does not necessarily conform to a specified model. For example, the unstructured database may include textual unstructured data that includes data which that does not conform to a specific pattern or model. Textual unstructured data may be generated in media like email messages, presentations, documents, instant messages, etc. Unstructured data may include non-textual data, such as images, video, audio, etc. Unstructured databases are commercially available and are desirable for use in situations where increased security is desired with respect to a structured database, where the overall size of data stored in the database is not known or can grow without determined bounds (e.g., in "big data" like applications), etc. An example of a commercially available unstructured database is the Cassandra™ database.

An integration testing tool, for example, performs testing of a software application, also referred to as an application. The integration testing tool may test modules of the application after the modules are combined. For example, different modules of the application may perform different operations, and the integration testing may test whether the modules operate in a determined manner when combined. The modules may be independently tested prior to being combined, and then, the modules are combined and tested for integration testing. Integration testing tools are commercially available. An example of a commercially available integration testing tool is the IBM Rational Integration Tester™, which may be used to test applications as part of web service automation testing.

The unstructured database may store data for the application being tested. For example, the unstructured database may be a backend database for the application, and stores data used by the application. The integration testing tool may test whether functions operate in a determined manner. The functions may include operations performed by one or more modules of the application. When the integration testing tool tests functions performed by the application, the application may store data in the unstructured database. To determine whether the application functions operate in a determined manner, the integration testing tool may need to retrieve the data from the unstructured database. The data from the unstructured database is compared by the integration testing tool and/or the ITA to validation data, which may be determined from server logs or is otherwise determined or provided to the integration testing tool and/or the ITA. If the results retrieved from the unstructured database match the validation data, then the application functions may be determined to be operating in a specified manner by the integration testing tool and/or the ITA.

As mentioned above, the ITA connects the integration testing tool to the unstructured database. For example, the ITA facilitates the integration testing tool to connect, store, query and perform other database operations on the unstructured database for integration testing of the application. Without the ITA, the integration testing tool may be unable to communicate with the unstructured database, and may be unable to retrieve application data from the unstructured database to validate the functions and operations performed by the application. For example, Structured Query Language (SQL) is commonly used by applications to store and retrieve data from a structured database. However, SQL relies on the schema of the structured database, including the fields, for storage and retrieval of the data. The unstructured database may not use a schema, and thus, conventional SQL queries may not be used to retrieve data from the unstructured database. The ITA makes it possible for the integration testing tool to retrieve data and perform other database operations on the unstructured database as is further discussed below.

As disclosed herein, the elements of the ITA may be embodied as machine readable instructions stored on a non-transitory computer readable medium. In an example, the ITA may include Java™ components, and the integration testing tool may call components of the ITA, for example, as a plugin. In addition, or alternatively, the elements of the ITA may be hardware or a combination of machine readable instructions and hardware.

The ITA may operate as a database connector that may interact with an unstructured database using a corresponding unstructured database driver for the unstructured database, where the unstructured database is used for integration testing of an application. The ITA may further operate in conjunction with the unstructured database driver to retrieve data from the underlying unstructured database. The unstructured database driver may forward a query (e.g., where the query is related to a function performed by an application that uses the unstructured database) to the unstructured database, and perform retrieval, manipulation, removal, and/or other operations on the data in the unstructured database.

The ITA may parse a configuration file that includes configuration details of the unstructured database. The configuration details may include an enablement/disablement status of an unstructured database. The enablement/disablement status of the unstructured database may be used to indicate which unstructured database of a plurality of unstructured databases is to be connected to the integration testing tool. The configuration details may further include a driver name of a driver file that is to be placed in a library folder of the integration testing tool for the integration testing tool to connect to the appropriate unstructured database. The configuration details may further include Internet Protocol (IP) addresses of nodes of the unstructured database, where the IP addresses are used by an unstructured database driver to discover cluster topology associated with the unstructured database. The configuration details may further include namespaces that define data replication on nodes that are configured to store data.

The ITA may establish a connection between an integration testing tool and the unstructured database. In this regard, the connection may be established by a connection establisher of the ITA. The connection establisher may parse the configuration file and information in a driver file of the unstructured database. The driver file may enable the application to interact with the unstructured database. The driver file may specify the connection to the unstructured database, and implement a protocol for transferring queries and results between the integration testing tool and the unstructured database.

The ITA may access data in the unstructured database by using a transaction file. In this regard, a connection executor may access data in the unstructured database by using the transaction file. The data may represent a result of performance of a function by the application. The performance of the function by the application may be invoked by the integration testing tool to test the application. The transaction file may include a transaction identification (ID), transaction type, and a query related to the function performed by the application, where the transaction ID and the transaction type are associated with the query.

The ITA may validate the result of the function performed by the application. In this regard, a function result validator may validate a result of the function performed by the application. The function result validator may validate the result of the function performed by the application by comparing validation data from an application server with data from the unstructured database.

Further, the ITA may control operation of a device based on the validation of the result of the function performed by the application. In this regard, a device controller may control operation of the device based on the validation of the result of the function performed by the application. The device may include any type of device including a processor capable of executing machine-readable instructions to perform one or more operations.

FIG. 1 illustrates an integration testing adapter (ITA) 100, according to an example of the present disclosure. Referring to FIG. 1, the ITA 100 may include a database configuration analyzer 102 to parse a configuration file 104 that includes configuration details of an unstructured database 106. Although one unstructured database 106 is illustrated in FIG. 1, a plurality of unstructured databases may be communicatively connected to ITA 100. In this regard, as disclosed herein, the configuration file 104 may include configuration details of a plurality of unstructured databases. For example, the configuration file 104 may include an "onthefly.xml" file that includes configuration details of the underlying unstructured database 106. The configuration file 104 may include identifiers of the unstructured database 106, as well as connection details such as IP addresses of nodes of the unstructured database 106, namespaces that define data replication on nodes, etc. The configuration file 104 may include the details of database parameters for various unstructured databases, such as, for example, Cassandra™, Mongo™, etc. Examples of database parameters may include credentials needed to access the unstructured database 106, database-specific parameter information, etc. Also, the configuration file 104 may be parsed by the database configuration analyzer 102, and used for establishing a connection between an integration testing tool 108 and the unstructured database 106.

Figure 2:
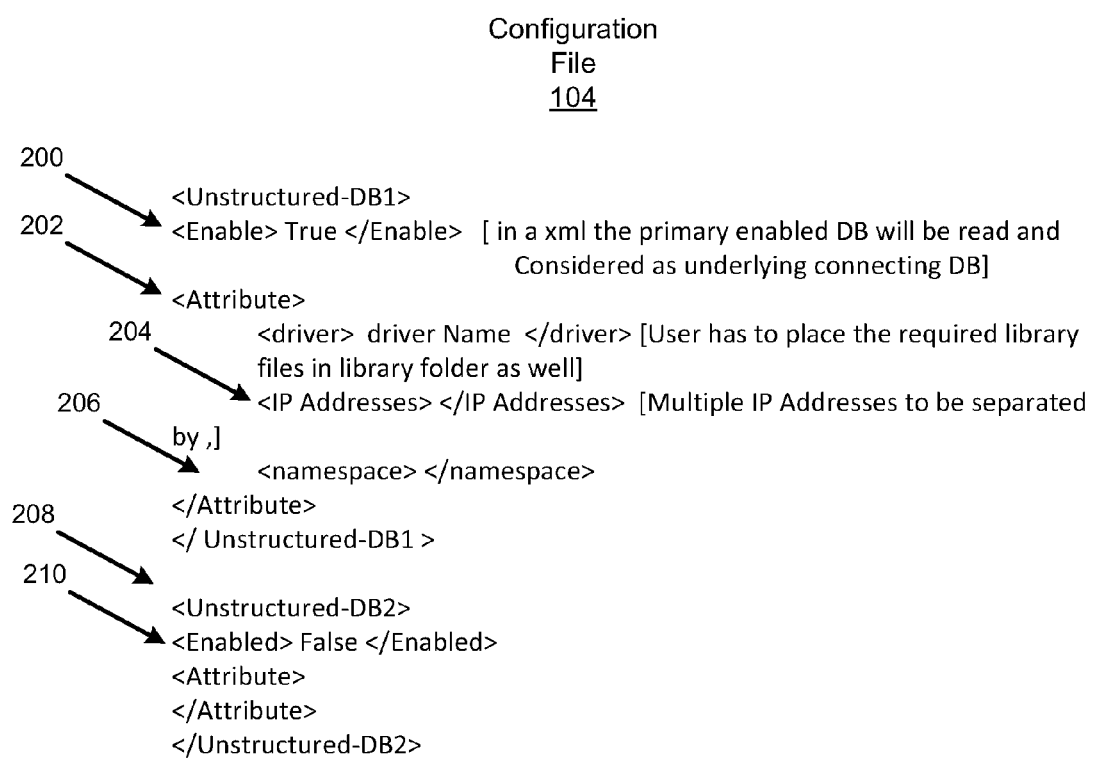
FIG. 2 illustrates a configuration file for the integration testing adapter of FIG. 1, according to an example of the present disclosure.

An example of the configuration file 104 is illustrated in FIG. 2. As shown in FIG. 2, at 200, the primary enabled database may be read and considered as an underlying connecting database. For example, there may be multiple databases that may be used to store application data for various applications. The ITA 100 may connect to a particular database that is associated with integration testing of the application 112, as specified in the configuration file 104. At 202, with respect to "attribute", required library files are placed in a library folder 134 of the integration testing tool 108. In this regard, the configuration details may include a driver name of a driver file 126 that is to be placed in the library folder 134 of the integration testing tool 108 for the integration testing tool 108 to connect to the appropriate unstructured database 106. At 204, multiple IP addresses of nodes of the unstructured database 106 may be identified and separated, for example, by a comma (,). For example, the unstructured database 106 may include a cluster of nodes for storing data. Commonly, for "Big Data" hundreds or even thousands of nodes may be used in an unstructured database to store data. Data may be replicated to multiple nodes to improve performance for both read and write operations. One or more IP addresses of nodes for the unstructured database 106 that store data for the application 112 may be included in the configuration file 104 at 204. At 206, the configuration details may further include namespaces that define data replication on nodes. At 208, in addition to unstructured database-1 (designated as unstructured-DB1), other unstructured databases may be included in the configuration file 104 (e.g. unstructured-DB2, etc.). The enabled/disabled attribute for the unstructured-DB2 may be entered at 210. The enabled/disabled attribute may be implemented by using, for example, a true/false entry as illustrated in FIG. 2 to respectively enable/disable a corresponding unstructured database. In this regard, the primary unstructured database at 200 is indicated as being enabled, and the unstructured-DB2 is indicated as being disabled.

Referring back to FIG. 1, a connection establisher 110 may establish a connection between the integration testing tool 108 and the unstructured database 106. For example, the connection establisher 110 may parse the configuration file 104 to identify the unstructured database and nodes to connect with that store data for the application, and to identify a driver (e.g., unstructured database driver 114 and driver file 126) to facilitate connecting with and performing database operations, such as reads and writes, on the unstructured database 106. The driver file 126 may be placed in the library folder 134 specified in the configuration file 104, and may include application program interfaces (APIs) for connecting with the unstructured database 106. Also, the unstructured database driver 114 may facilitate performing database operations on the unstructured database 106. For example, for the Cassandra™ unstructured database, the unstructured database driver 114 and driver file 126 may include DataStax™ drivers and driver files that include APIs for connecting with the Cassandra™ unstructured database, and may perform queries compatible with the Cassandra™ unstructured database.

In an example, the connection establisher 110 may use a connector class to connect to the unstructured database 106. The connector class may include routines to determine and connect to the unstructured database driver 114 of the unstructured database 106. In this regard, the connector class may include customized Java™ code to determine and connect to the unstructured database driver 114. For example, customized code of the connector class may read the configuration file 104 to determine the driver name associated with the unstructured database 106. Further, the customized code of the connector class may read the configuration file 104 to determine appropriate routines for connecting to the unstructured database 106. For example, the customized code of the connector class may read the configuration file 104 to determine the namespace, and to determine the node of a cluster hosting the unstructured database 106 to establish a connection to retrieve data for validating the tested application. The connector class may be database type specific, and may be placed in a connector folder 132.

For each unstructured database and associated driver, a connector class may be written and added into the connector folder 132. Mapping between the integration testing tool 108 and the unstructured database 106 may be established by the configuration file 104 and the connector class. For example, once the configuration file 104 is read to identify the unstructured database 106 and to identify the unstructured database driver 114, a connector class corresponding to the unstructured database driver 114 may be called from the connector folder 132. This connector class may use the drivers in the library folder 134, and may also use other parameters, such as connection points, to establish a connection between the integration testing tool 108 and the unstructured database 106. Once the connection is established, a connection executor 116 may be invoked as disclosed herein.

The connection executor 116 may facilitate execution of a function of the application 112 that is being tested by the integration testing tool 108. The connection executor 116 may facilitate execution of the function by using a transaction file 118. According to an example, the transaction file 118 may be predetermined for a particular function to be performed by the application 112. The transaction file 118 may be used by the integration testing tool 108 and/or the ITA 100 to perform operations such as read, insert, update, or delete on data 130 stored in the unstructured database 106. For example, the transaction file 118 may be denoted as "DBName_0.Transaction.xml", with the database name being specified as "DBName". The transaction file 118 may include the transaction ID, transaction type, and the query associated with the function performed by the application 112. The transaction ID and the transaction type may be associated with the query. The query may be part of the function being tested. For example, a function that executes an account transaction may use a read query to retrieve the account balance from the unstructured database 106 in order to perform the account transaction.

An example of the transaction file 118 is illustrated in FIG. 3. As shown in FIG. 3, the transaction ID may be listed at 300 (e.g., transaction ID=121), with the transaction type (e.g., read, insert, update, or delete) being entered at 302. The query (e.g., "Select a, b, c from MyTable where x=? And y=?") may be entered at 304, with the resulting transaction ID being entered at 306. Transaction types such as insert, update, or delete may be performed on the unstructured database 106 prior to invoking of the function performed by the application 112.

Referring back to FIG. 1, the connection executor 116 may be built based on an abstract factory pattern. The abstract factory pattern may be described as a design pattern used to create the connection executor 116. Use of the abstract factory pattern may provide an interface for creating families of related or dependent objects without specifying their concrete classes. For example, the connection executor 116 may read properties from the configuration file 104 and return an abstract pointer that is bounded by the concrete class in the underlying implementation.

A function result validator 120 may validate a result of the function performed by the application 112. The function result validator 120 may be implemented as a component of the ITA 100 as illustrated in FIG. 1, as part of the integration testing tool 108, or separately from the ITA 100 and the integration testing tool 108. An application server 128 may host and execute the application 112. The function result validator 120 may validate the result of the function performed by the application 112. The function result validator 120 may compare validation data generated by the application server 128 executing the application 112 with the data 130 from the unstructured database 106. The validation data may include server logs from the application server 128, where the server logs are associated with performance of a function by the application 112. In response to a determination that the validation data from the application server 128 matches the data 130 from the unstructured database 106, the function result validator 120 may determine that the result of the function performed by the application 112 is valid. Further, in response to a determination that the validation data from the application server 128 does not match the data 130 from the unstructured database 106, the function result validator 120 may determine that the result of the function performed by the application 112 is invalid.

With respect to matching of the validation data from the application server 128 to the data 130 from the unstructured database 106, according to an example, a log of the function performed by the application 112 as stored on the application server 128 may be compared to corresponding values stored in the unstructured database 106. For example, application 112, designated a System-A application, may call a System-B application. The System-A application and the System-B application may record passing payloads as validation data in the application server 128. The passing payloads may include, for example, transaction results associated with a function performed by the System-A application, which also calls the System-B application to perform the function. The passing payloads may be compared to the data 130 from the unstructured database 106 to determine whether the passing payloads are correctly generated by the System-A application and the System-B application. For example, a transaction result associated with the System-A application and the System-B application may be compared to a transaction result stored in the unstructured database 106 to determine whether the transaction results are identical, or whether one of the applications has incorrectly modified the transaction results. According to another example, data associated with a transaction may need be replicated across multiple databases. In this regard, data associated with a transaction may be recorded as validation data in the application server 128. The data associated with the transaction may be compared to the data 130 from the unstructured database 106 to determine whether the data associated with the transaction and the data 130 from the unstructured database 106 are identical, and thus correctly replicated.

A device controller 122 may control operation of a device 124 in response to a determination that the result of the function performed by the application 112 is valid. Examples of operations of the device 124 may include dispensing cash at an automatic teller machine (ATM), generating a fraud alert with respect to a bank transaction, etc. The device 124 may include any type of device including a processor capable of executing machine-readable instructions to perform one or more operations.

Based on the query type related to the function performed by the application 112, the class (e.g., Java™ class) for executing the query may be called from an executor folder of the connection executor 116. The executor folder may hold components that include routines for manipulating data in the unstructured database 106 after establishing a connection using the connection establisher 110. The executor folder may include the components that execute queries on the unstructured database 106 to manipulate data in the unstructured database 106 based on the queries related to the function performed by the application 112. For example, the executor folder may retrieve the transaction ID from the transaction file 118, retrieve the query from the transaction file 118 based on the transaction ID, and execute the query using the connection established by the connection establisher 110.

A database specific class may be added to the executor folder to support multiple unstructured databases. The database specific class may be designated as an executor class which is database specific because different databases use different query languages to perform actions. Thus, in order to operate with a specific database type, the connection executor 116 may use specific routines that are specified by the database type. For example, for a Cassandra™ database, the database specific classes may include CassandraReadQryClass, CassandraInsertQryClass, etc., in the executor folder.

In order to invoke the ITA 100 from the integration testing tool 108 or another tool, the ITA 100 may be called with two parameters. The first parameter may include the TransactionID, and the second parameter may include the 'parameters' to query. As disclosed herein, the query to the unstructured database 106 may be related to the function performed by the application 112. For the example of FIG. 3, with respect to the read query, a read query invoking package may be called as follows: ReadDataFromMyUSdb 121 SB121 (where, 121 is the transaction ID, and SB121 is the parameter to the query). In this example, ReadDataFromMyUSdb 121 SB121 may be used to invoke the ITA 100. For the transaction ID (e.g., 121), the corresponding query may be taken from the configuration file. For example, select x,y,z from myTable where savingsAcctNumber=?. For the parameter SB121, this parameter may replace the '?' for the savingsAcctNumber=?. The query may be sent to the unstructured database 106 via an interface 136.

The result of the query may be received from the unstructured database via the interface 136. The result of the query may be written as a text file, with the file name as the transactionID. The data may be written as a comma-separated value (CSV) for a read query.

With respect to implementation of the ITA 100 in the integration testing tool 108, according to examples, components of the ITA 100 may be implemented in the integration testing tool 108 as a plugin. For example, the database configuration analyzer 102, the connection establisher 110, the connection executor 116, and the function result validator 120 may be implemented in the integration testing tool 108 as a plugin. The integration testing tool 108 may include a step to call external components in the testing flows. Such a step may be used to call the ITA 100 with the required parameters.

With respect to customization, the ITA 100 may be built, for example, by using Java technology. Hence the ITA 100 may be expanded to accommodate automation of various test cases that involve manipulation of data retrieved from the unstructured database 106. For example, the ITA 100 may be expanded to accommodate automation of applying certain logic to the retrieved data, and calling consecutive services to validate end-to-end flows. Thus, in applying logic, the ITA 100 may be expanded to obtain logic objects dynamically, and execute based on the test case.

Examples of application of the ITA 100 may include anomaly detection (e.g., fraud detection, or any type of event detection). According to an example related to anomaly detection, the application 112 may include data that is stored in the unstructured database 106 (e.g., where the unstructured database 106 operates as a back-end database). According to an example, the data may be stored using clusters (e.g., Cassandra™ clusters for a Cassandra™ database). In order to validate results of a function performed by the application 112, the ITA 100 may be used to validate results of the function performed by the application 112. For example, the application 112 may include a banking application. An example of a function performed by the application 112 may include withdrawal of a predetermined amount of funds from an account. Once the function is triggered from the integration testing tool 108, the function result validator 120 may use an automation script to verify log values from the application server 128 with the data 130 of unstructured database 106. In this regard, the function result validator 120 may verify that the log values from the application server 128 are accurate. The function result validator 120 may operate in conjunction with the database configuration analyzer 102, the connection establisher 110, and the connection executor 116 to execute the query, which is associated with the function performed by the application 112, to the unstructured database 106 to validate validation data related to the application. The validation data may represent the columns or the data field names. In this regard, the ITA 100 may provide for the execution of a function to the application 112, and validation (e.g., by the function result validator 120) of the validation data of the application 112 with the associated data 130 stored in the unstructured database 106. For the example of fraud detection, examples of fields that may be checked include account, channel, timestamp, source ID, target ID, etc. For the example of fraud detection, examples of queries for transactions may include account balance checks, cash withdrawal, deposits, etc.

For the example of validation of the validation data of the application 112 with the associated data 130 stored in the unstructured database 106 disclosed herein, the function result validator 120 may generate an alert if the validation data of the application 112 does not match the associated data 130 stored in the unstructured database 106. Alternatively, if the validation data of the application 112 matches the associated data 130 stored in the unstructured database 106, the function result validator 120 may trigger the device controller 122 to control operation of the device 124. For an example of an ATM, the device 124 may include a cash dispenser, where the device controller 122 may control operation of the ATM to dispense cash.

According to another example of application of the ITA 100, a bank may create account information on its system of records. When the accounts are created, the details of the accounts may need to be verified. If the system of records is an unstructured database that can be accessed by web services, the integration testing tool 108 may be used to create the account, and then validate whether the account has been created according to the transaction creating it by querying the unstructured database and verifying the records on it.

Figure 4:
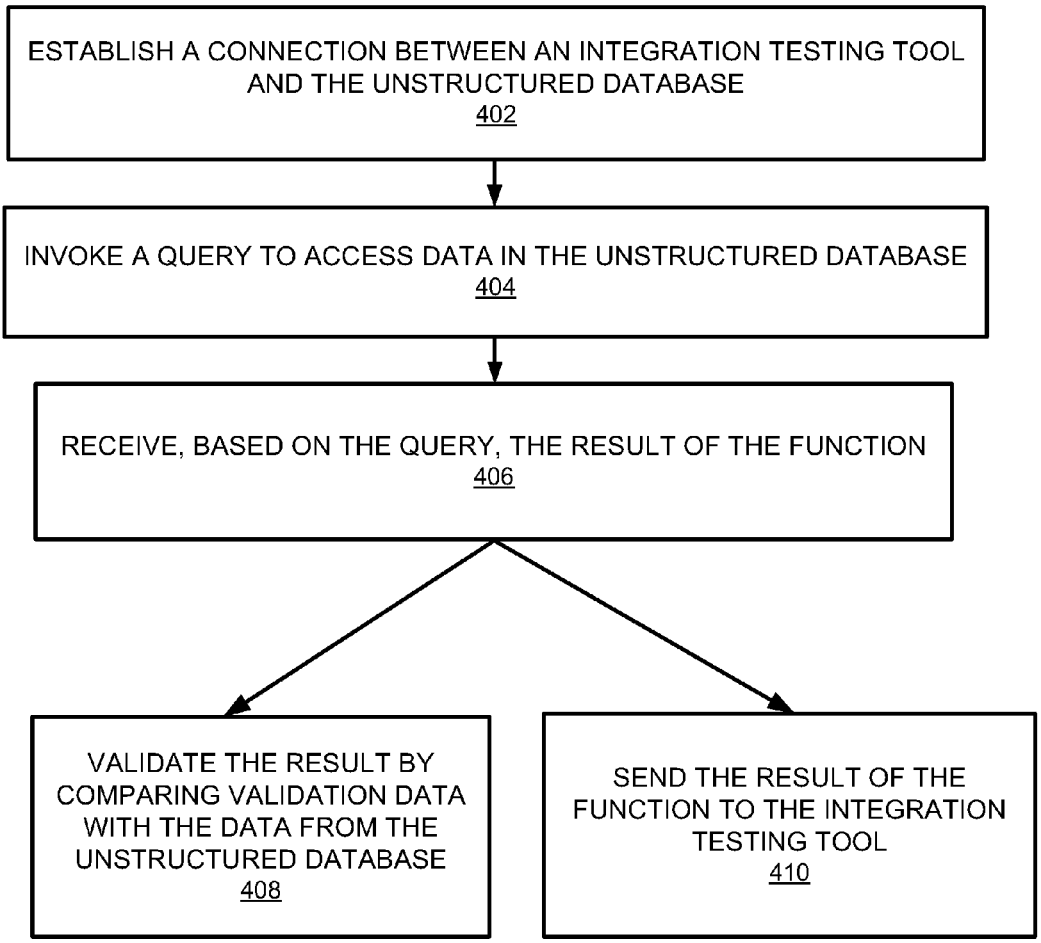
FIG. 4 illustrates a flowchart of a method for performing integration testing using an unstructured database, according to an example of the present disclosure.

FIG. 4 illustrates a flowchart of a method 400 for performing integration testing using an unstructured database, according to an example. The method 400 may be implemented on the ITA 100 described above with reference to FIGS. 1-3 by way of example and not limitation.

Referring to FIGS. 1-4, and particularly FIG. 4, at block 402, the method 400 may include establishing a connection between the integration testing tool 108 and the unstructured database 106. The integration testing tool 108 performs integration testing of the application 112. The connection may be established based on parsing of the configuration file 104 to identify configuration details of the unstructured database 106. For example, referring to FIG. 1, the connection establisher 110 may establish the connection between the integration testing tool 108 and the unstructured database 106.

For the method 400, establishing the connection between the integration testing tool 108 and the unstructured database 106 may further include identifying, from the configuration file 104, the unstructured database 106 for establishing the connection from a plurality unstructured databases that are operable to store the data 130 for the application 112. Further, establishing the connection between the integration testing tool 108 and the unstructured database 106 may include determining, from the configuration file 104, the unstructured database driver 114 for connecting to the identified unstructured database 106, and establishing the connection with the identified unstructured database 106 according to a protocol specified in the unstructured database driver 114. According to an example, the unstructured database driver 114 may include a Java Database Connectivity (JDBC) protocol to establish the connection with the identified unstructured database 106.

For the method 400, establishing the connection between the integration testing tool 108 and the unstructured database 106 may further include determining, from the configuration file 104, an IP address of a node in the unstructured database 106 storing the data 130 that represents the result of the function, and sending a message to the IP address to establish the connection.

For the method 400, establishing the connection between the integration testing tool 108 and the unstructured database 106 may further include determining, from the configuration file 104, a namespace, and using the namespace to access the query results from the unstructured database.

At block 404, the method 400 may include invoking a query to access the data 130 in the unstructured database 106. The query may be specified in the transaction file 118. The data 130 may represent a result of a function. The result may be produced when the function is performed by the application 112. The function is performed during the integration testing of the application 112. For example, referring to FIG. 1, the connection executor 116 may invoke the query to access the data 130 in the unstructured database 106.

At block 406, the method 400 may include receiving, based on the query, the result of the function. For example, referring to FIG. 1, the connection executor 116 may receive, based on the query, the result of the function.

At block 408, the method 400 may include validating the result by comparing validation data with the data 130 from the unstructured database 106. For example, referring to FIG. 1, the function result validator 120 may validate the result of the function.

According to examples, the method 400 may further include controlling operation of the device 124 based on the validation of the result of the function. For example, referring to FIG. 1, the device controller 122 may control operation of the device 124 based on the validation of the result of the function.

According to examples, for the method 400, the operations of establishing, invoking, and validating may be implemented as a plugin for the integration testing tool 108.

At block 410, instead of validating the result of the function at block 408, the method 400 may include sending the result of the function to the integration testing tool 108. The integration testing tool 108 may validate the result of the function. The integration testing tool 108 may validate the result of the function by comparing validation data with the data 130 from the unstructured database 106. An indication may be received from the integration testing tool 108 as to whether the result of the function is valid or invalid. Operation of the device 124 may be controlled based on the received indication from the integration testing tool 108.

According to examples, a method for performing integration testing using an unstructured database may include retrieving the configuration file 104 stored in the memory, and parsing the configuration file 104 to identify configuration details of the unstructured database 106. A connection may be established between the integration testing tool 108 and the unstructured database 106 based on the configuration details. The integration testing tool 108 may test a function performed by the application 112. The application 112 may store data in the unstructured database 106 responsive to performing the function. The method for performing integration testing using the unstructured database may further include identifying the transaction file 118 that is stored in the memory. The transaction file 118 may specify a database operation to be performed by the unstructured database 106 to retrieve the data stored in the unstructured database 106 responsive to the application 112 performing the function. A query may be generated based on the database operation. The query may be in a format usable by the unstructured database 106. For example, the class (e.g., Java™ class) for executing the query may convert the query in the transaction file 118 to the format usable by the unstructured database 106. The query may be sent via an interface to the unstructured database 106 for execution. Results of the query may be received via the interface. The query results may be compared to validation data to determine whether the function operates in a determined manner. The determined manner may mean that the function operates as intended, or so as to produce a correct result or operation.

Figure 5:
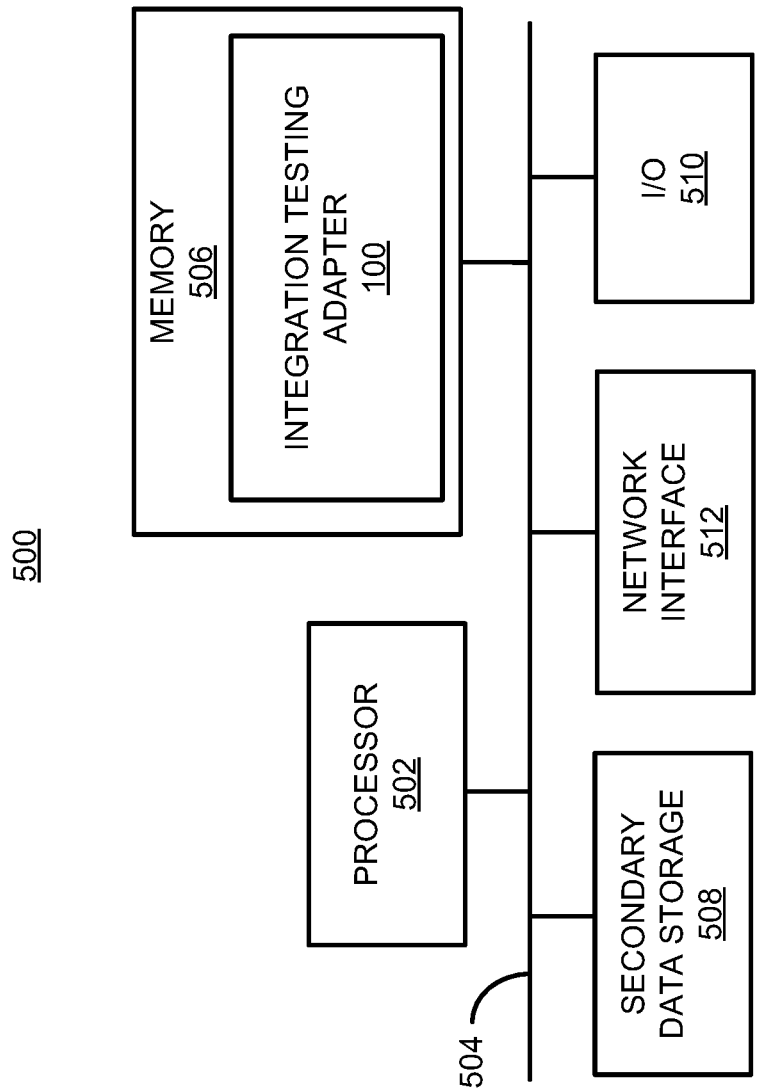
FIG. 5 illustrates a computer system, according to an example of the present disclosure.

FIG. 5 shows a computer system 500 that may be used with the examples described herein. The computer system may represent a computational platform that includes components that may be in a server or another computer system. The computer system 500 may be used as part of a platform for the ITA 100. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 may include a processor 502 that may implement or execute machine readable instructions performing some or all of the methods, functions and other processes described herein. Commands and data from the processor 502 may be communicated over a communication bus 504. The computer system may also include a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include the ITA 100 including machine readable instructions residing in the memory 506 during runtime and executed by the processor 502.

The computer system 500 may include an I/O device 510, such as a keyboard, a mouse, a display, etc. The computer system may include a network interface 512 for connecting to a network. Other known electronic components may be added or substituted in the computer system.

The processor 502 may be designated as a hardware processor. The processor 502 may execute various components of the ITA 100. For example, the processor 502 may execute the database configuration analyzer 102, the connection establisher 110, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An integration testing adapter comprising:
a memory to store instructions; and
a processor, connected to the memory, to execute the instructions to:
retrieve a configuration file stored in the memory;
parse the configuration file to identify configuration details of an unstructured database;
establish a connection between an integration testing tool and the unstructured database based on the configuration details, where
the integration testing tool is to test at least one function performed by an application, and
the application is to store data in the unstructured database responsive to performing the at least one function, and where
the connection between the integration testing tool and the unstructured database is established by:
determining, from the configuration details, an Internet Protocol (IP) address of a node of a plurality of nodes in the unstructured database storing the data from the application; and
sending a message to the IP address to establish the connection;
identify a transaction file that is stored in the memory, where
the transaction file specifies a database operation to be performed by the unstructured database to retrieve the data stored in the unstructured database responsive to the application performing the at least one function,
the transaction file includes a transaction identification and a transaction type, and
the transaction type comprising a read, an insert, an update, or a delete,
where the transaction type of the insert, the update, or the delete, if performed, is performed prior to performing the at least one function;
generate a query based on the database operation, where the query is in a format usable by the unstructured database;
send, via an interface, the query to the unstructured database for execution;
receive, via the interface, query results; and
compare the query results to validation data to determine whether the at least one function operates in a determined manner.

2. The integration testing adapter of claim 1, where the processor further executes the instructions to:
establish the connection between the integration testing tool and the unstructured database based on the configuration details by:
identifying, from the configuration details, the unstructured database for establishing the connection from a plurality unstructured databases that are operable to store data for the application;
determining, from the configuration details, a driver for connecting to the identified unstructured database, the driver including application programming interfaces for connecting with the identified unstructured database,
placing the driver in a library of the integration testing tool, and accessing the driver from the library of the integration testing tool; and
establishing the connection with the identified unstructured database,
the establishing performed according to a protocol specified in the driver,
the establishing performed based on a connector class that includes routines and connection points, and
the connector class to determine and connect to the driver.

3. The integration testing adapter of claim 1, where the processor further executes the instructions to:
establish the connection between the integration testing tool and the unstructured database based on the configuration details by:
determining, from the configuration details, a namespace that defines data replication on the node that is configured to store data; and
using the namespace to access the query results from the unstructured database.

4. The integration testing adapter of claim 1, where the processor further executes the instructions to:
validate the query results based on the comparison of the query results to the validation data to determine whether the at least one function operates in the determined manner; and
control operation of a device based on the validation of the query results of the at least one function performed by the application.

5. The integration testing adapter according to claim 4, where the processor further executes the instructions to:
in response to a determination that the validation data matches the query results, determine that the at least one function operates in the determined manner; or
in response to a determination that the validation data does not match the query results, determine that the at least one function does not operate in the determined manner.

6. The integration testing adapter according to claim 5, where the processor further executes the instructions to:
generate an alert in response to the determination that the at least one function does not operate in the determined manner.

7. A method for performing integration testing using an unstructured database, the method comprising:
establishing a connection between an integration testing tool and the unstructured database, where
the integration testing tool performs integration testing of an application,
the connection is established based on
parsing of a configuration file to identify configuration details of the unstructured database,
determining, from the configuration details, an Internet Protocol (IP) address of a node of a plurality of nodes in the unstructured database storing data from the application, and
sending a message to the IP address to establish the connection, and
the establishing is performed by a computer;
invoking a query to access the data in the unstructured database, where
the query is specified in a transaction file,
the transaction file includes a transaction identification and a transaction type, and
the transaction type comprising a read, an insert, an update, or a delete,
where the transaction type of the insert, the update, or the delete, if performed, is performed prior to performing a function,
the data represents a result of the function:
the result produced when the function is performed by the application; and
the function is performed during the integration testing of the application, and
the invoking is performed by the computer;
receiving, based on the query, the result of the function, where
the receiving is performed by the computer; and
validating the result by comparing validation data with the data from the unstructured database, where
the validating is performed by the computer.

8. The method of claim 7, further comprising:
controlling operation of a device based on the validation of the result of the function, where
the controlling is performed by the computer.

9. The method of claim 8, where validating the result and controlling the operation of the device based on the validation of the result of the function further comprises:
in response to a determination that the validation data matches the data from the unstructured database,
determining that the result of the function is valid, and
controlling operation of the device to perform a predetermined operation associated with the function; and
in response to a determination that the validation data does not match the data from the unstructured database,
determining that the result of the function is invalid, and
generating an alert.

10. The method of claim 7, further comprising:
implementing the operations of establishing, invoking, and validating as a plugin for the integration testing tool.

11. The method of claim 7, where establishing the connection between the integration testing tool and the unstructured database further comprises:
identifying, from the configuration file, the unstructured database for establishing the connection from a plurality unstructured databases that are operable to store the data for the application;
determining, from the configuration file, a driver for connecting to the identified unstructured database; and
establishing the connection with the identified unstructured database according to a protocol specified in the driver.

12. The method of claim 7, where establishing the connection between the integration testing tool and the unstructured database further comprises:
determining, from the configuration file, a namespace that defines data replication on the node that is configured to store data; and
using the namespace to access the data from the unstructured database.

13. The method of claim 7, where the validation data includes data from log files of a device that executes the application.

14. A non-transitory computer-readable medium storing instructions, the instructions comprising:
one or more instructions which, when executed by one or more processors, cause the one or more processors to:
establish a connection between an integration testing tool and an unstructured database, where the integration testing tool performs integration testing of an application, and
the connection is established based on
parsing of a configuration file to identify configuration details of the unstructured database,
determining, from the configuration details,
an Internet Protocol (IP) address of a node of a plurality of nodes in the unstructured database storing data from the application, and
a namespace that defines data replication on the node,
sending a message to the IP address to establish the connection, and
using the namespace to access a result of a query from the unstructured database;
invoke the query to access data in the unstructured database, where
the query is specified in a transaction file,
the transaction file includes a transaction identification and a transaction type, and
the transaction type comprising a read, an insert, an update, or a delete,
where the transaction type of the insert, the update, or the delete, if performed, is performed prior to performing a function, and
the data represents the result of the function:
the result produced when the function is performed by the application; and
the function is performed during the integration testing of the application;
receive, based on the query, the result of the function; and
send the result of the function to the integration testing tool, where
the integration testing tool is to validate the result of the function.

15. The non-transitory computer-readable medium of claim 14, where the integration testing tool is to validate the result of the function by comparing validation data with the data from the unstructured database.

16. The non-transitory computer-readable medium of claim 14, where the instructions to establish the connection between the integration testing tool and the unstructured database further include instructions to:
identify, from the configuration file, the unstructured database for establishing the connection from a plurality unstructured databases that are operable to store the data for the application;
determine, from the configuration file, a driver for connecting to the identified unstructured database; and
establish the connection with the identified unstructured database according to a protocol specified in the driver.

17. The non-transitory computer-readable medium of claim 14, further comprising instructions to:
receive an indication from the integration testing tool as to whether the result of the function is valid or invalid; and
control operation of a device based on the received indication from the integration testing tool.

* * * * *